(12) United States Patent
Hung et al.

(10) Patent No.: US 9,076,364 B2
(45) Date of Patent: Jul. 7, 2015

(54) ELECTRONIC DEVICE AND METHOD FOR ADJUSTTING DISPLAY SCREEN

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Jian-Hung Hung, New Taipei (TW); Min Yang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 34 days.

(21) Appl. No.: 14/093,063

(22) Filed: Nov. 29, 2013

(65) Prior Publication Data

US 2014/0176424 A1 Jun. 26, 2014

(30) Foreign Application Priority Data

Dec. 24, 2012 (CN) .......................... 2012 1 05645174

(51) Int. Cl.
G06F 3/12 (2006.01)
G06F 1/16 (2006.01)
G09G 5/00 (2006.01)

(52) U.S. Cl.
CPC .............. *G09G 5/006* (2013.01); *G06F 1/1601* (2013.01); *G06F 3/12* (2013.01)

(58) Field of Classification Search
CPC ... G06F 3/011; G06F 3/012; G09G 2320/028; H04N 13/0468; H04N 13/0475; H04N 13/0477; H04N 13/0479; H04N 13/0481
See application file for complete search history.

(56) References Cited

U.S. PATENT DOCUMENTS

| | | | |
|---|---|---|---|
| 7,092,001 B2 * | 8/2006 | Schulz | 348/14.05 |
| 2005/0007445 A1 * | 1/2005 | Foote et al. | 348/14.08 |
| 2005/0110867 A1 * | 5/2005 | Schulz | 348/14.05 |
| 2005/0179618 A1 * | 8/2005 | Oh | 345/7 |
| 2007/0206349 A1 * | 9/2007 | Jacobs | 361/683 |
| 2008/0105807 A1 * | 5/2008 | Oh | 248/278.1 |
| 2009/0174658 A1 * | 7/2009 | Blatchley et al. | 345/158 |
| 2010/0039380 A1 * | 2/2010 | Lanier | 345/156 |
| 2012/0075166 A1 * | 3/2012 | Marti et al. | 345/1.1 |
| 2012/0287160 A1 * | 11/2012 | Guo | 345/649 |

* cited by examiner

*Primary Examiner* — Patrick F Marinelli
(74) *Attorney, Agent, or Firm* — Novak Druce Connolly Bove + Quigg LLP

(57) ABSTRACT

In a method for adjusting a display screen of an electronic device, the method obtains a current image and a previous image of a user captured by an image capturing device, detects a first face area from the current image and a second face area from the previous image. The method further rotates the display screen according to the movements of the user's face, and stops rotating the display screen when rotation angles of the display screen are equal to movement angles of the user's face.

9 Claims, 5 Drawing Sheets

ELECTRONIC DEVICE AND METHOD FOR ADJUSTING DISPLAY SCREEN

BACKGROUND

1. Technical Field

Embodiments of the present disclosure relate to automatic control technology, and particularly to an electronic device and a method for adjusting a display screen of the electronic device.

2. Description of Related Art

Currently, a position of a display screen is often fixed in use on an electronic device. The position of a display screen cannot be changed according to a movement of a user's face. Therefore, a method for adjusting a display screen of an electronic device is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
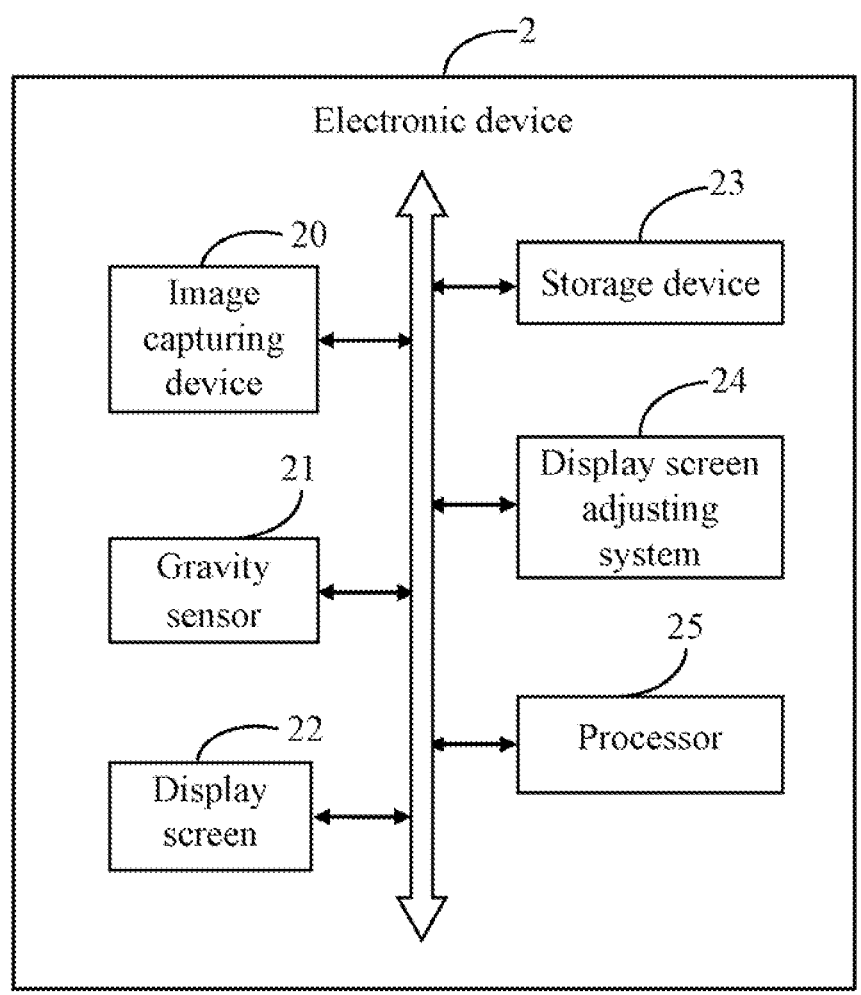
FIG. 1 is a block diagram of one embodiment of an electronic device including a display screen adjusting system.

FIG. 1 is a block diagram of one embodiment of an electronic device 2 including a display screen adjusting system 24. The electronic device 2 further includes an image capturing device 20, a gravity sensor (G-sensor) 21, a display screen 22, a storage device 23, and at least one processor 25. It should be understood that FIG. 1 illustrates only one example of the electronic device 2 that may include more or fewer components than illustrated, or a different configuration of the various components in other embodiments. In one embodiment, the electronic device 2 may be a desktop computer.

In one embodiment, the gravity sensor 21 is used to detect rotation angles of the display screen 22 in an X-axis direction, a Y-axis direction, and an Z-axis direction. The processor 25 may be an embedded controller of a single chip micyoco (SCM), such as a 8032 SCM. A work voltage of the processor 25 is three volts.

Figure 4:
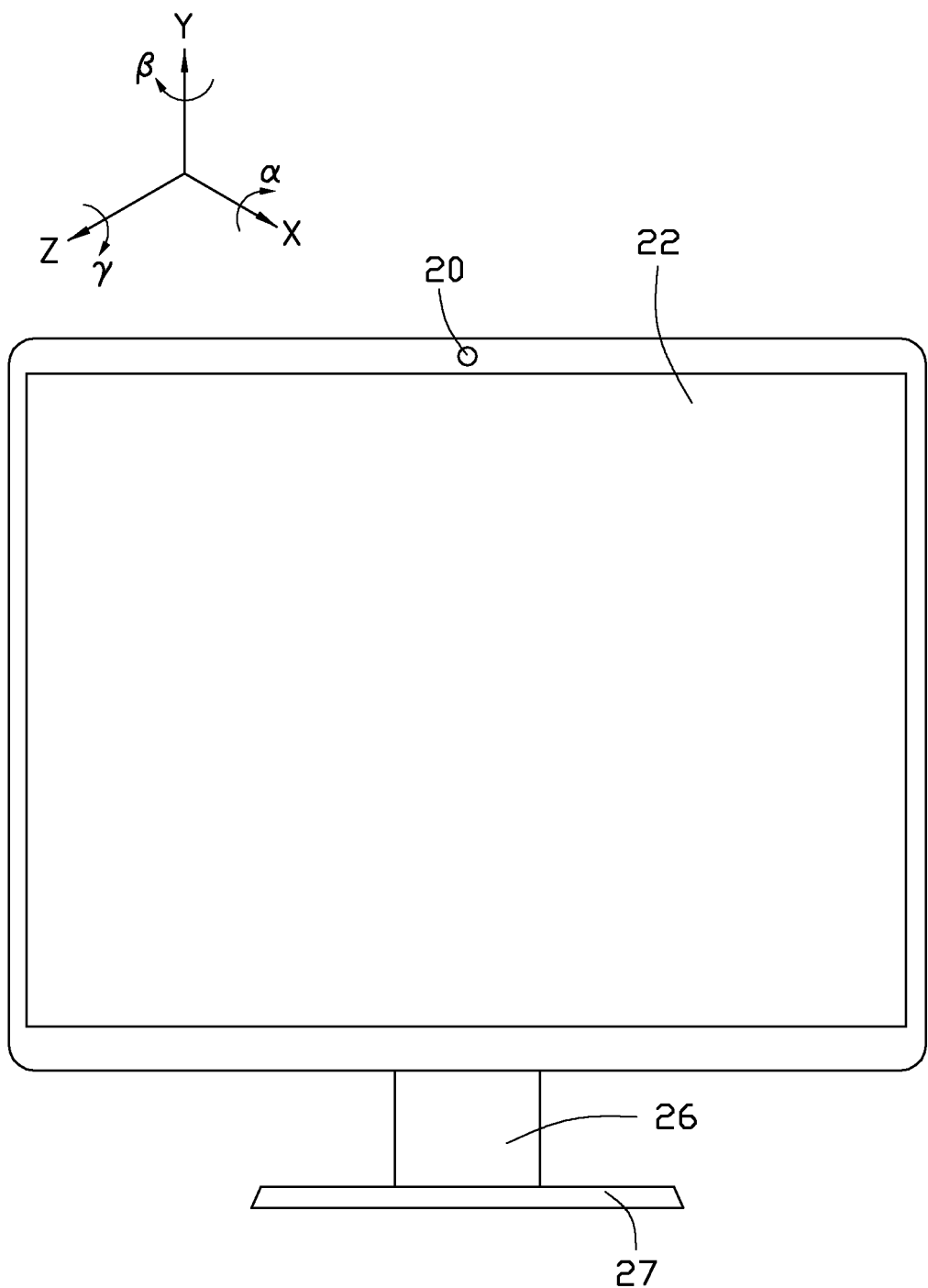
FIG. 4 is a schematic diagram of a front view of the display screen.
Figure 5:
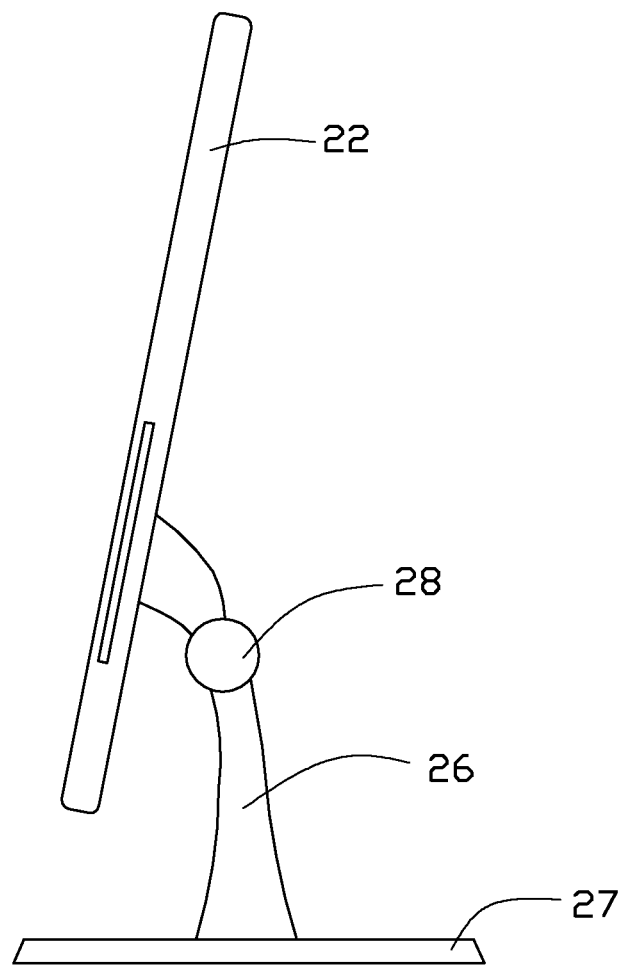
FIG. 5 is a schematic diagram of a side view of the display screen.

As shown in FIG. 4, the image capturing device 20 is located on a middle position of a top border of the display screen 22, the display screen 22 is connected with a pedestal 27 through a bracket 26. In addition, as shown in FIG. 5, a rotating bearing 28 is positioned in the bracket 26. The rotating bearing 28 is a spherical bearing. A driving motor is also installed in the bracket 26, and the rotating bearing 28 is rotated using the driving motor, so that the display screen 22 is controlled to rotate in accordance with the rotating of the rotating bearing 28.

In one embodiment, the image capturing device 20 is used to capture images of a user, and store the captured images in the storage device 23. For example, the image capturing device 20 may be an Internet Protocol (IP) camera, and the image capturing device 20 captures ten images per second (10 frames/s). That is to say, a capture interval of the image capturing device 20 is about 0.1 seconds.

The display screen adjusting system 24 is used to obtain images captured by the image capturing device 20 from the storage device 23, detect face areas from the captured images, and rotate the display screen 22 according to a movement of a user's face. In one embodiment, the display screen adjusting system 24 may include computerized instructions in the form of one or more programs that are executed by the processor 25 and stored in the storage device 23 (or memory). A detailed description of the display screen adjusting system 24 will be given in the following paragraphs.

Figure 2:
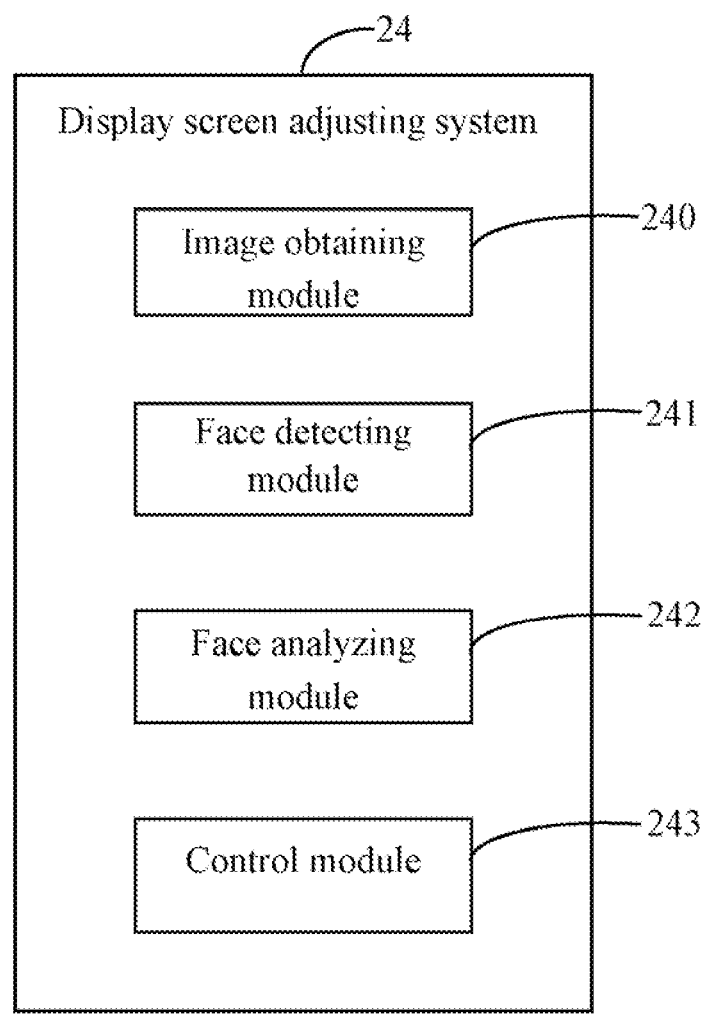
FIG. 2 is a block diagram of function modules of the display screen adjusting system included in the electronic device.

FIG. 2 is a block diagram of function modules of the display screen adjusting system 24 included in the electronic device 2. In one embodiment, the display screen adjusting system 24 may include one or more modules, for example, an image obtaining module 240, a face detecting module 241, a face analyzing module 242, and a control module 243. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3:
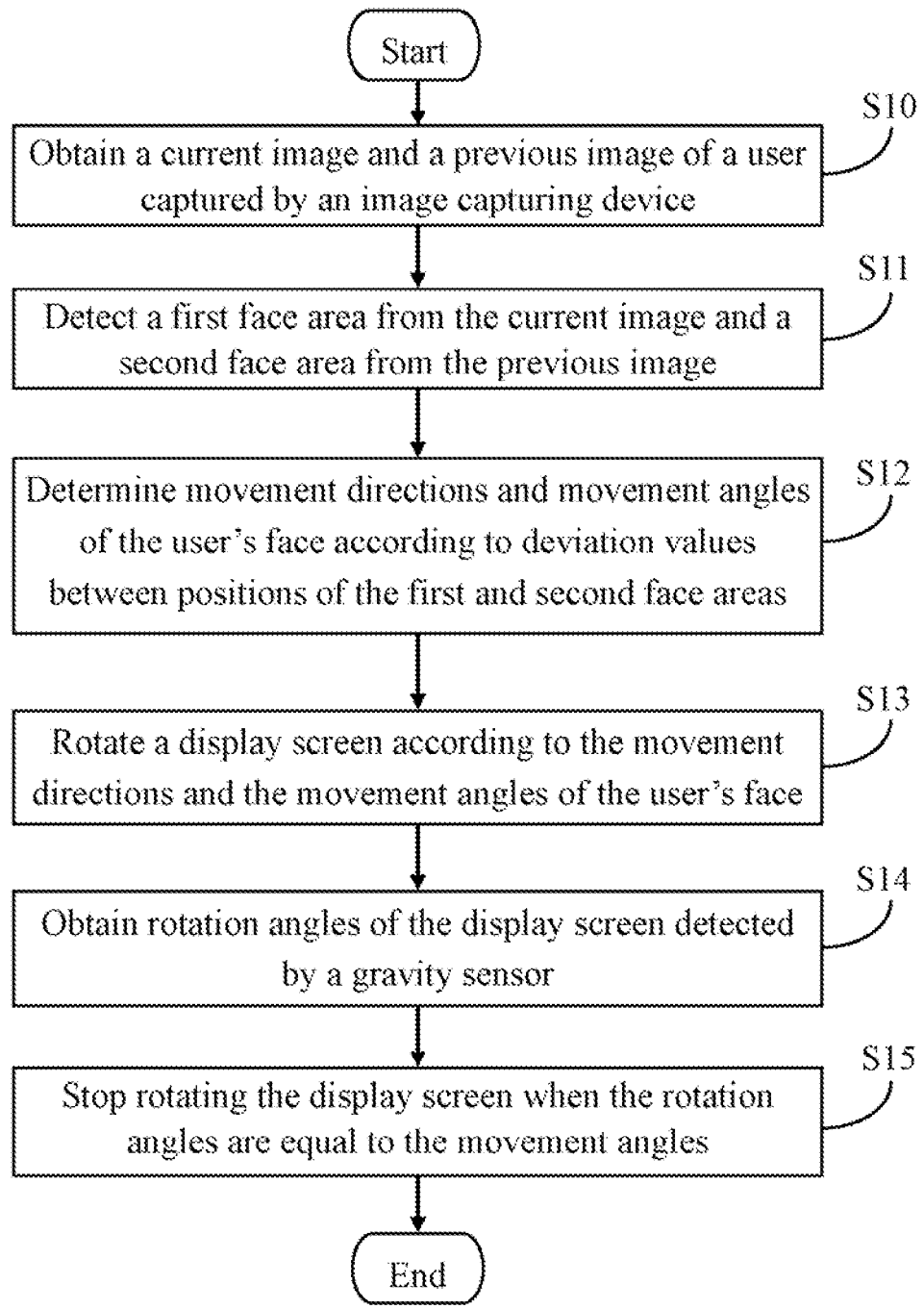
FIG. 3 is a flowchart of one embodiment of a method for adjusting a display screen of the electronic device.

FIG. 3 is a flowchart of one embodiment of a method for adjusting the display screen 22 of the electronic device 2. Depending on the embodiment, additional steps may be added, others removed, and the ordering of the steps may be changed.

In step S10, the image obtaining module 240 obtains a current image and a previous image of a user captured by the image capturing device 20 from the storage device 23. The previous image is captured before the current image.

In step S11, the face detecting module 241 detects a first face area from the current image and a second face area from the previous image. In one embodiment, the face detecting module 241 detects the first face area and the second face area using an skin color model in YCbCr space or a face template matching method, or other suitable face detection methods. In one embodiment, the first face area may be a first smallest rectangle framing the face of the user in the current image, and the second face area may be a second smallest rectangle framing the face of the user in the previous image.

In step S12, the face analyzing module 242 determines movement directions and movement angles of the user's face according to deviation values between positions of the first face area and the second face area. In one embodiment, the movement directions may include a movement direction in an X-axis of a three dimensional (3D) coordinate system of the display screen 22 (hereinafter referred to as "X-axis movement direction"), a movement direction in a Y-axis of the 3D coordinate system of the display screen 22 (hereinafter referred to as "Y-axis movement direction"), and a movement direction in an Z-axis of the 3D coordinate system of the display screen 22 (hereinafter referred to as "Z-axis movement direction"). As shown in FIG. 4, the X-axis of the 3D coordinate system is a width of the display screen 22, the Y-axis of the 3D coordinate system is a height of the display screen 22, and the Z-axis of the 3D coordinate system is perpendicular to a plane of the display screen 22. In one embodiment, the deviation values may include a deviation value between coordinates of a center point of the first face area and a center point of the second face area in the X-axis (hereinafter referred to as "X-axis deviation value"), a deviation value in the Y-axis (hereinafter referred to as "Y-axis deviation value"), and a deviation value in the Z-axis (hereinafter referred to as "Z-axis deviation value").

As shown in FIG. 4, the movement angles may include a movement angle "α" in the X-axis (hereinafter referred to as "X-axis movement angle"), a movement angle "β" in the Y-axis (hereinafter referred to as "Y-axis movement angle"), and a movement angle "y" in the Z-axis (hereinafter referred to as "Z-axis movement angle"). For example, the face analyzing module 242 determines the X-axis movement direction of the user's face is leftward, if an X-axis deviation value of the center point of the first face area and the center point of the second face area is less than zero.

In one embodiment, the face analyzing module 242 determines the movement directions and the movement angles of the user's face in the X-Y-Z axes using a fast face tracking algorithm according to the deviation values between positions of the first face area and the second face area. For example, the fast face tracking algorithm may be a face tracking method base on Camshift algorithm.

In step S13, the control module 243 rotates the display screen 22 according to the movement directions and the movement angles of the user's face by controlling the driving motor installed in the bracket 26 rotating the rotating bearing 28, and then the display screen 22 is rotated.

For example, the control module 243 rotates the display screen 22 leftward with the X-axis movement angle of the user's face, if the X-axis movement direction of the user's face is leftward. The control module 243 rotates the display screen 22 rightward with the X-axis movement angle of the user's face, if the X-axis movement direction of the user's face is rightward. The control module 243 rotates the display screen 22 upward with the Y-axis movement angle of the user's face, if the Y-axis movement direction of the user's face is upward. The control module 243 rotates the display screen 22 downward with the Y-axis movement angle of the user's face, if the Y-axis movement direction of the user's face is downward.

In step S14, the control module 243 obtains rotation angles of the display screen 22 detected by the gravity sensor 21. In one embodiment, the gravity sensor 21 detects the rotation angles of the display screen 22 when the display screen 22 is rotated. The rotation angles may include a rotation angle in the X-axis (hereinafter referred to as "X-axis rotation angle"), a rotation angle in the Y-axis (hereinafter referred to as "Y-axis rotation angle"), and a rotation angle in the Z-axis (hereinafter referred to as "Z-axis rotation angle").

In step S15, the control module 243 stops rotating the display screen 22 when the rotation angles of the display screen 22 are equal to the movement angles of the user's face.

For example, suppose that "a1", "a2", and "a3" represent the X-axis movement angle, the Y-axis movement angle, and the Z-axis movement angle of the user's face respectively, "b1", "b2", and "b3" represent the X-axis rotation angle, the Y-axis rotation angle, and the Z-axis rotation angle of the display screen 22 respectively. The control module 243 stops rotating the display screen 22 when "b1=a1", "b2=a2", and "b3=a3", so that a display direction of the display screen 22 is directly opposite to the user's face, and an optimized visual effect is achieved.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for adjusting a display screen of an electronic device, the method comprising:
    obtaining a current image and a previous image of a user captured by an image capturing device installed on the display screen;
    detecting a first face area from the current image and a second face area from the previous image;
    determining movement directions and movement angles of a user's face according to deviation values between positions of the first face area and the second face area;
    rotating the display screen according to the movement directions and the movement angles of the user's face;
    obtaining rotation angles of the display screen detected by a gravity sensor of the electronic device; and
    stopping rotating the display screen when the rotation angles of the display screen are equal to the movement angles of the user's face,
    wherein the movement angles of the user's face comprise an X-axis movement angle, a Y-axis movement angle, and an Z-axis movement angle of the user's face, the rotation angles of the display screen comprise an X-axis rotation angle, a Y-axis rotation angle, and an Z-axis rotation angle of the display screen, and
    wherein the display screen is rotated by controlling a driving motor, installed in a bracket of the display screen, to rotate a rotating bearing of the bracket in the X-axis direction, the Y-axis direction, and the Z-axis direction according to the movement directions and the movement angles of the user's face.

2. The method according to claim 1, wherein the first face area and the second face area are detected using an skin color model in YCbCr space or a face template matching method.

3. The method according to claim 1, wherein the movement directions and the movement angles of the user's face are determined using a fast face tracking algorithm according to the deviation values between positions of the first face area and the second face area.

4. An electronic device, comprising:
    a processor;
    a storage device storing a plurality of instructions, which when executed by the processor, causes the processor to:
        obtain a current image and a previous image of a user captured by an image capturing device installed on a display screen of the electronic device;
        detect a first face area from the current image and a second face area from the previous image;
        determine movement directions and movement angles of a user's face according to deviation values between positions of the first face area and the second face area;
        rotate the display screen according to the movement directions and the movement angles of the user's face;

obtain rotation angles of the display screen detected by a gravity sensor of the electronic device; and stop rotating the display screen when the rotation angles of the display screen are equal to the movement angles of the user's face, wherein the movement angles of the user's face comprise an X-axis movement angle, a Y-axis movement angle, and an Z-axis movement angle of the user's face, the rotation angles of the display screen comprise an X-axis rotation angle, a Y-axis rotation angle, and an Z-axis rotation angle of the display screen, and wherein the display screen is rotated by controlling a driving motor, installed in a bracket of the display screen, to rotate a rotating bearing of the bracket in the X-axis direction, the Y-axis direction, and the Z-axis direction according to the movement directions and the movement angles of the user's face.

5. The electronic device according to claim 4, wherein the first face area and the second face area are detected using an skin color model in YCbCr space or a face template matching method.

6. The electronic device according to claim 4, wherein the movement directions and the movement angles of the user's face are determined using a fast face tracking algorithm according to the deviation values between positions of the first face area and the second face area.

7. A non-transitory storage medium having stored thereon instructions that, when executed by a processor of a electronic device, causes the electronic device to perform a method for adjusting a display screen of the electronic device, the method comprising:

obtaining a current image and a previous image of a user captured by an image capturing device installed on the display screen;

detecting a first face area from the current image and a second face area from the previous image;

determining movement directions and movement angles of a user's face according to deviation values between positions of the first face area and the second face area;

rotating the display screen according to the movement directions and the movement angles of the user's face;

obtaining rotation angles of the display screen detected by a gravity sensor of the electronic device; and stopping rotating the display screen when the rotation angles of the display screen are equal to the movement angles of the user's face, wherein the movement angles of the user's face comprise an X-axis movement angle, a Y-axis movement angle, and an Z-axis movement angle of the user's face, the rotation angles of the display screen comprise an X-axis rotation angle, a Y-axis rotation angle, and an Z-axis rotation angle of the display screen, and wherein the display screen is rotated by controlling a driving motor, installed in a bracket of the display screen, to rotate a rotating bearing of the bracket in the X-axis direction, the Y-axis direction, and the Z-axis direction according to the movement directions and the movement angles of the user's face.

8. The non-transitory storage medium according to claim 7, wherein the first face area and the second face area are detected using an skin color model in YCbCr space or a face template matching method.

9. The non-transitory storage medium according to claim 7, wherein the movement directions and the movement angles of the user's face are determined using a fast face tracking algorithm according to the deviation values between positions of the first face area and the second face area.

* * * * *